US011683461B2

(12) United States Patent
Vaden et al.

(10) Patent No.: US 11,683,461 B2
(45) Date of Patent: Jun. 20, 2023

(54) SYSTEMS AND METHODS FOR IDENTIFYING VIEWING DIRECTIONS FOR VIDEO CONTENT

(71) Applicant: GoPro, Inc., San Mateo, CA (US)

(72) Inventors: Mark Vaden, San Diego, CA (US); Ingrid A. Cotoros, Hillsborough, CA (US); Scott Novell, Carlsbad, CA (US); Valérian Dottel, Allevard (FR); Guillaume Tilloux, Chapareillan (FR); Loïc Bailliard, Annecy (FR); Loïc Lanoir, La Trinite (FR)

(73) Assignee: GoPro, Inc., San Mateo, CA (US)

(*) Notice: Subject to any disclaimer, the term of this patent is extended or adjusted under 35 U.S.C. 154(b) by 86 days.

(21) Appl. No.: 17/239,639

(22) Filed: Apr. 25, 2021

(65) Prior Publication Data
US 2021/0250567 A1   Aug. 12, 2021

Related U.S. Application Data

(63) Continuation of application No. 16/884,632, filed on May 27, 2020, now Pat. No. 10,992,915, which is a continuation of application No. 15/981,667, filed on May 16, 2018, now Pat. No. 10,687,039.

(51) Int. Cl.
*H04N 13/117* (2018.01)
*H04N 13/366* (2018.01)

(52) U.S. Cl.
CPC ......... *H04N 13/117* (2018.05); *H04N 13/366* (2018.05)

(58) Field of Classification Search
CPC .............. H04N 13/117; H04N 13/366; H04N 5/23258; H04N 5/2328; H04N 5/23238; G06F 3/012
See application file for complete search history.

(56) References Cited

U.S. PATENT DOCUMENTS

| 10,687,039 | B1 | 6/2020 | Vaden |
| 10,992,915 | B2 | 4/2021 | Vaden |
| 2002/0026269 | A1 | 2/2002 | Tanaka |
| 2006/0271287 | A1 | 11/2006 | Gold |

(Continued)

OTHER PUBLICATIONS

Tompkin 'Video Collections in Panoramic Contexts', UIST'13, Oct. 8-11, 2013 (Year: 2013) 10 pages.

*Primary Examiner* — Nasim N Nirjhar
(74) *Attorney, Agent, or Firm* — Esplin & Associates, PC

(57) ABSTRACT

Video information and sensor information may be obtained. The video information may define spherical video content having a progress length. The spherical video content may define visual content viewable from a point a view as a function of progress through the progress length of the spherical video content. The spherical video content may be captured by one or more image capture devices. The sensor information may characterize capture of the spherical video content. A viewing direction for the spherical video content may be determined based on the sensor information and/or other information. The viewing direction may define a direction of view for the spherical video content from the point of view as the function of progress through the progress length of the spherical video content. The spherical video content may be presented on a display based on the viewing direction.

20 Claims, 10 Drawing Sheets

(56) References Cited

U.S. PATENT DOCUMENTS

| | | |
|---|---|---|
| 2012/0120264 A1 | 5/2012 | Lee |
| 2014/0028847 A1 | 1/2014 | Wang |
| 2015/0341617 A1* | 11/2015 | Cole .................. G03B 35/08 |
| | | 348/36 |
| 2016/0005435 A1 | 1/2016 | Campbell |
| 2016/0171330 A1 | 6/2016 | Mentese |
| 2017/0195561 A1* | 7/2017 | Hegelich .............. H04N 9/8211 |
| 2018/0262687 A1 | 9/2018 | Hildreth |
| 2020/0288101 A1 | 9/2020 | Vaden |
| 2020/0332945 A1* | 10/2020 | Joo .................. G03B 17/561 |

\* cited by examiner

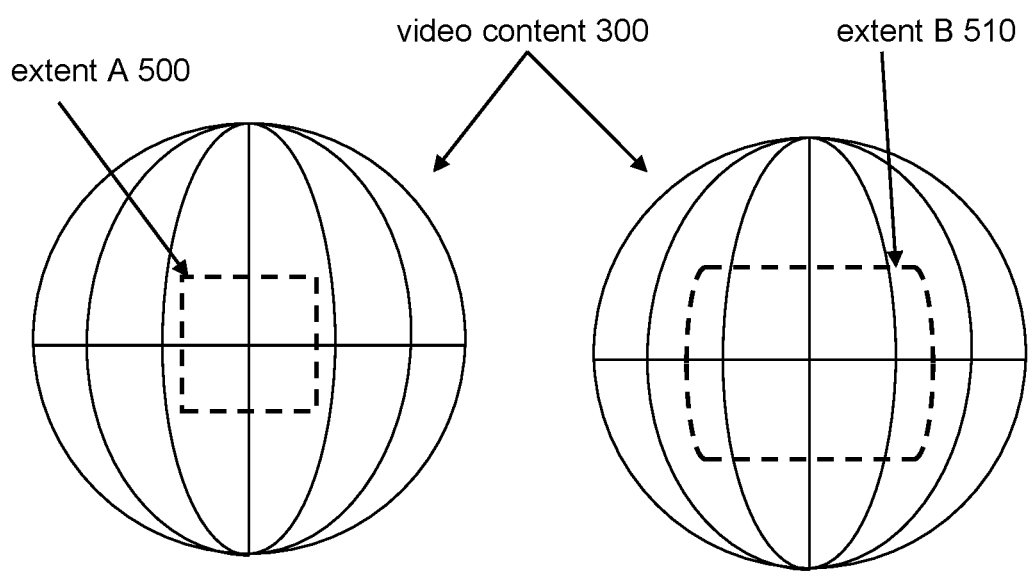

SYSTEMS AND METHODS FOR IDENTIFYING VIEWING DIRECTIONS FOR VIDEO CONTENT

FIELD

This disclosure relates to identifying viewing directions for video content based on sensor information.

BACKGROUND

Video content (e.g., spherical video content) may include capture of a larger visual extent/field of view than may be viewed at once. Identifying viewing directions at different moments within the video content may be difficult and/or time consuming.

SUMMARY

This disclosure relates to identifying viewing directions for video content. Video information, sensor information, and/or other information may be obtained. The video information may define spherical video content having a progress length. The spherical video content may define visual content viewable from a point a view as a function of progress through the progress length of the spherical video content. The spherical video content may be captured by one or more image capture devices. The sensor information may characterize capture of the spherical video content. A viewing direction for the spherical video content may be determined based on the sensor information and/or other information. The viewing direction may define a direction of view for the spherical video content from the point of view as the function of progress through the progress length of the spherical video content. The spherical video content may be presented on a display based on the viewing direction and/or other information.

A system that identifies viewing directions for video content may include one or more electronic storage, processor and/or other components. The electronic storage may store video information defining video content (e.g., spherical video content), sensor information, and/or other information. Video content may refer to media content that may be consumed as one or more videos. Video content may include one or more videos stored in one or more formats/containers, and/or other video content. Video content may have a progress length. Video content may define visual content viewable as a function of progress through the progress length of the video content. Visual content of the video content may be included within video frames of the video content. Video content may include spherical video content and/or other video content. Spherical video content may define visual content viewable from a point of view as a function of progress through the progress length of the spherical video content. The spherical video content may be captured by one or more image capture devices. In some implementations, the video content (e.g., spherical video content) may be consumed as virtual reality content.

The processor(s) may be configured by machine-readable instructions. Executing the machine-readable instructions may cause the processor(s) to facilitate identifying viewing directions for video content. The machine-readable instructions may include one or more computer program components. The computer program components may include one or more of a video information component, a sensor information component, a viewing direction component, a presentation component, and/or other computer program components.

The video information component may be configured to obtain video information defining one or more video content (e.g., spherical video content) and/or other information. The video information component may obtain video information from one or more storage locations. The video information component may obtain video information during acquisition of the video content and/or after acquisition of the video content by one or more image sensors/image capture devices.

The sensor information component may be configured to obtain sensor information and/or other information. The sensor information may characterize capture of the video content (e.g., spherical video content). In some implementations, the sensor information may characterize one or more directions of motion of the image capture device(s) during the capture of the video content. In some implementations, the sensor information may be generated by one or more motion sensors and/or one or more location sensors of the image capture device(s).

In some implementations, the sensor information may characterize one or more directions of motion of an object carrying the image capture device(s) during the capture of the video content. In some implementations, the object may include a vehicle, and the sensor information may be generated by one or more sensors of the vehicle. In some implementations, the sensor(s) of the vehicle may measure a rotation of a vehicle steering wheel, a tilt of the vehicle, and/or other characteristics of the vehicle.

In some implementations, the sensor information may characterize one or more directions of interest for the image capture device(s) during the capture of the video content. In some implementations, a direction of interest for the image capture device(s) may be determined based on a mounting of the image capture device(s) and/or other information. In some implementations, a direction of interest for the image capture device(s) may be determined further based on a user input and/or other information.

In some implementations, the sensor information may characterize one or more directions of one or more objects from the image capture device(s) during the capture of the video content. In some implementations, a direction of an object from the image capture device(s) may be determined based on visual analysis, sensor outputs, and/or other information.

The viewing direction component may be configured to determine one or more viewing directions for the video content (e.g., spherical video content) based on the sensor information and/or other information. A viewing direction may define a direction of view for the spherical video content from the point of view as the function of progress through the progress length of the spherical video content. In some implementations, a viewing direction may be determined based on the direction of motion of the image capture device(s) during the capture of the video content. In some implementations, a viewing direction may be determined based on direction of the motion of the object carrying the image capture device(s) during the capture of the video content. In some implementations, a viewing direction may be determined based on the direction(s) of interest for the image capture device(s) during the capture of the video content. In some implementations, a viewing direction may be determined based on the direction(s) of the object(s) from the image capture device(s) during the capture of the video content.

The presentation component may be configured to present the video content (e.g., spherical video content) on a display based on the viewing direction and/or other information. In some implementations, the presentation component may be configured to stabilize the video content (e.g., spherical video content) based on the viewing direction(s) and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 5A-5B illustrate example extents of spherical video content.

DETAILED DESCRIPTION

Figure 1:
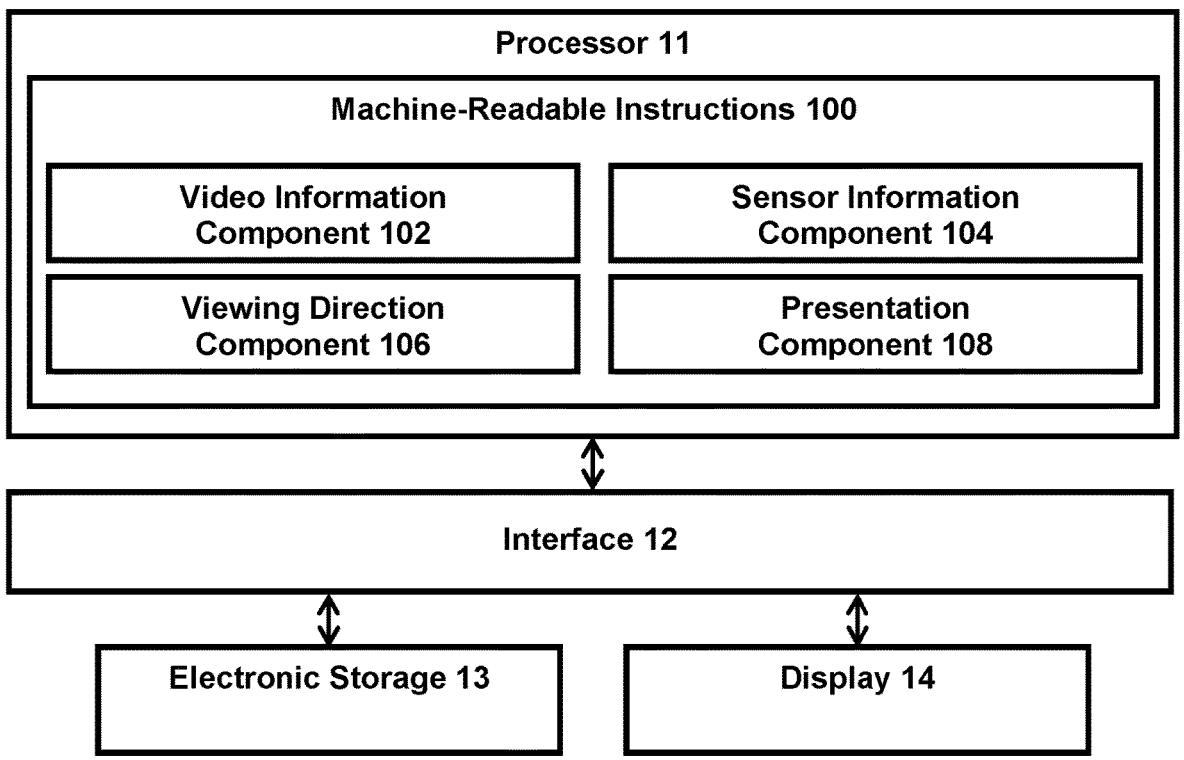
FIG. 1 illustrates a system that identifies viewing directions for video content.

FIG. 1 illustrates a system 10 for identifying viewing directions for video content. The system 10 may include one or more of a processor 11, an interface 12 (e.g., bus, wireless interface), an electronic storage 13, a display 14, and/or other components. Video information, sensor information, and/or other information may be obtained by the processor 11. The video information may define spherical video content having a progress length. The spherical video content may define visual content viewable from a point a view as a function of progress through the progress length of the spherical video content. The spherical video content may be captured by one or more image capture devices. The sensor information may characterize capture of the spherical video content. A viewing direction for the spherical video content may be determined by the processor 11 based on the sensor information and/or other information. The viewing direction may define a direction of view for the spherical video content from the point of view as the function of progress through the progress length of the spherical video content. The spherical video content may be presented on the display 14 based on the viewing direction and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, video content (e.g., spherical video content), image capture device, sensor, sensor information, capture of video content, viewing directions, and/or other information.

Video content may refer to media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by a video capture device, multiple video clips captured by a video capture device, and/or multiple video clips captured by different video capture devices. Video content may include multiple video clips captured at the same time and/or multiple video clips captured at different times. Video content may include a video clip processed by a video application, multiple video clips processed by a video application, and/or multiple video clips processed by different video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more image capture devices (e.g., cameras, image sensors) to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. A spherical video frame may include a spherical image of the spherical video content at a moment within the progress length of the spherical video content. For example, multiple images captured by multiple cameras/ images sensors at a moment in time may be combined/stitched together to form a spherical video frame for the moment in time. A spherical video frame may include a full spherical image capture (360 degrees of capture, including opposite poles) or a particular spherical image capture (less than 360 degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
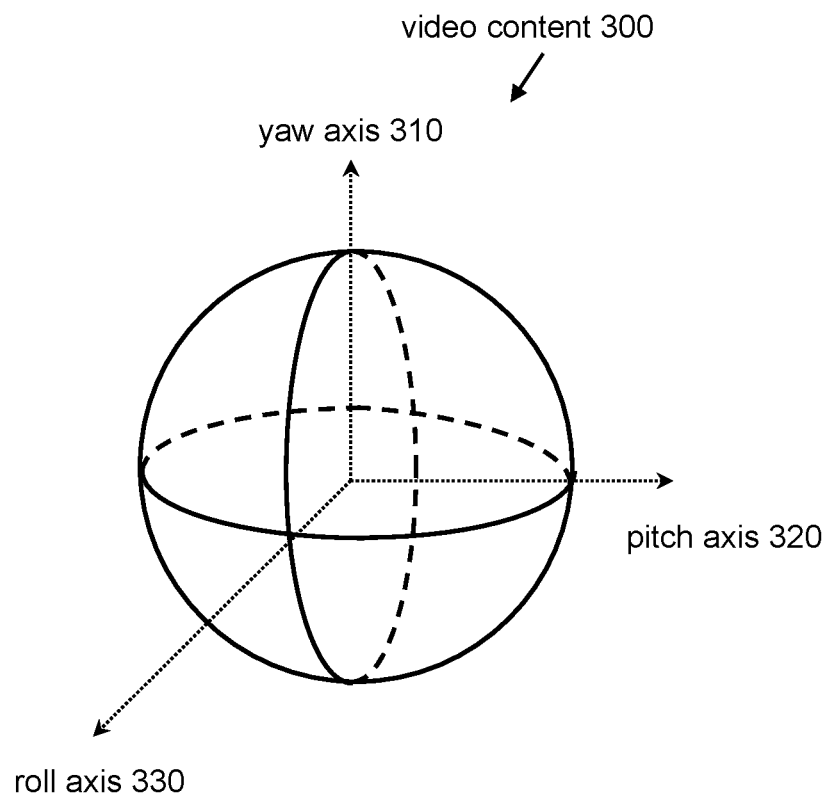
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the progress length of the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90-degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90-degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

A playback of video content (e.g., the video content 300) may include presentation of one or more portions of the video content on one or more displays (e.g., the display 14) based on a viewing window and/or other information. The viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by a viewing direction, viewing size (e.g., zoom), and/or other information. A viewing direction may define a direction of view for video content. A viewing direction may define the angle/visual portion of the video content at which the viewing window is directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content is defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

Figure 4:
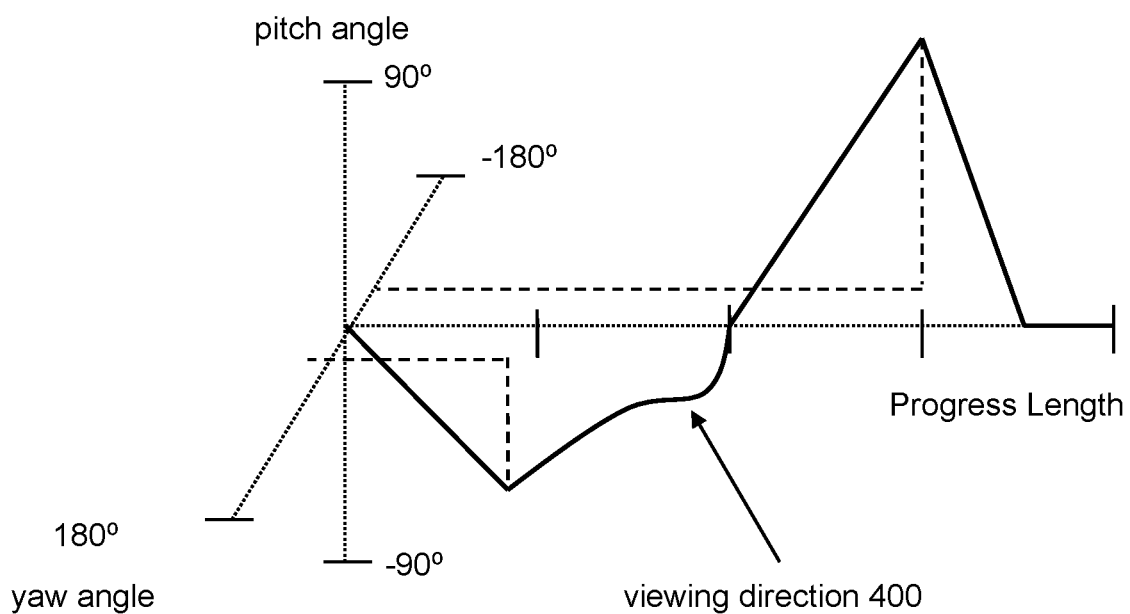
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

A viewing size may define a size (e.g., zoom, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). FIGS. 5A-5B illustrate examples of extents for the video content 300. In FIG. 5A, the size of the viewable extent of the video content 300 may correspond to the size of extent A 500. In FIG. 5B, the size of viewable extent of the video content 300 may correspond to the size of extent B 510. Viewable extent of the video content 300 in FIG. 5A may be smaller than viewable extent of the video content 300 in FIG. 5B. Other viewing sizes are contemplated.

In some implementations, a viewing size may define different shapes of viewable extents. For example, a viewing window may be shaped as a rectangle, a triangle, a circle, and/or other shapes. In some implementations, a viewing size may define different rotations of the viewing window (viewing rotation). A viewing size may change based on a rotation of viewing. For example, a viewing size shaped as a rectangle may change the orientation of the rectangle based on whether a view of the video content includes a landscape view or a portrait view. Other rotations of a viewing window are contemplated.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate identifying viewing directions for video content. The machine-readable instructions 100 may include one or more computer program components. The machine-readable instructions 100 may include one or more of a video information component 102, a sensor information component 104, a viewing direction component 106, a presentation component 108, and/or other computer program components.

The video information component 102 may be configured to obtain video information defining one or more video content (e.g., spherical video content) and/or other information. Obtaining video information may include one or more of accessing, acquiring, analyzing, determining, examining, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors. For example, the video information component 102 may obtain video information defining a video while the video is being captured by one or more image sensors. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more video content in which viewing directions are to be identified. The video information defining the video content may be obtained based on the user's selection of the video content through the user interface/video application.

The sensor information component 104 may be configured to obtain sensor information and/or other information. Obtaining sensor information may include one or more of accessing, acquiring, analyzing, determining, examining, loading, locating, opening, receiving, retrieving, reviewing, storing, and/or otherwise obtaining the sensor information. The sensor information component 104 may obtain sensor information from one or more locations. For example, the sensor information component 104 may obtain sensor information from a storage location, such as the electronic storage 13, electronic storage of information and/or signals generated by one or more sensors, electronic storage of a device accessible via a network, and/or other locations. The sensor information component 104 may obtain sensor information from one or more hardware components (e.g., a sensor) and/or one or more software components (e.g., software running on a computing device).

The sensor information component 104 may be configured to obtain sensor information for video content during acquisition of the video content and/or after acquisition of the video content. For example, the sensor information component 104 may obtain sensor information for a video while the video is being captured by one or more image sensors. The sensor information component 104 may obtain sensor information for video content after the video content has been captured and stored in memory (e.g., the electronic storage 13). For example, the sensor information may be captured and stored by a sensor, and may be obtained by the sensor information component 104 when viewing directions of video content is to be determined.

The sensor information may characterize capture of the video content (e.g., spherical video content). The sensor information may characterize one or more circumstances relating to capture of the video content. The sensor information may characterize the entire duration during which the video content is captured, a portion of the duration during which the video content is captured, or for a length of time longer than the duration during which the video content is captured. The sensor information may characterize one or more operations and/or surroundings of image capture device(s) that captured the video content, one or more operations and/or surroundings of equipment used with of image capture device(s) that captured the video content, and/or other information relating to the capture of video content.

For example, the sensor information may characterize one or more directions of motion of the image capture device(s) during the capture of the video content. Motion of an image capture device may refer change in location and/or position of the image capture device. Motion of an image capture device may include translational motion and/or rotational motion. In some implementations, the sensor information may be generated by one or more motion sensors and/or one or more location sensors of the image capture device(s). For example, the sensor information may be generated by an accelerometer, a gyroscope, an inertial measurement unit (IMU), a global positioning system (GPS), a distance sensor, and/or other motion/location sensor(s) of the image capture device(s).

Figure 6A:
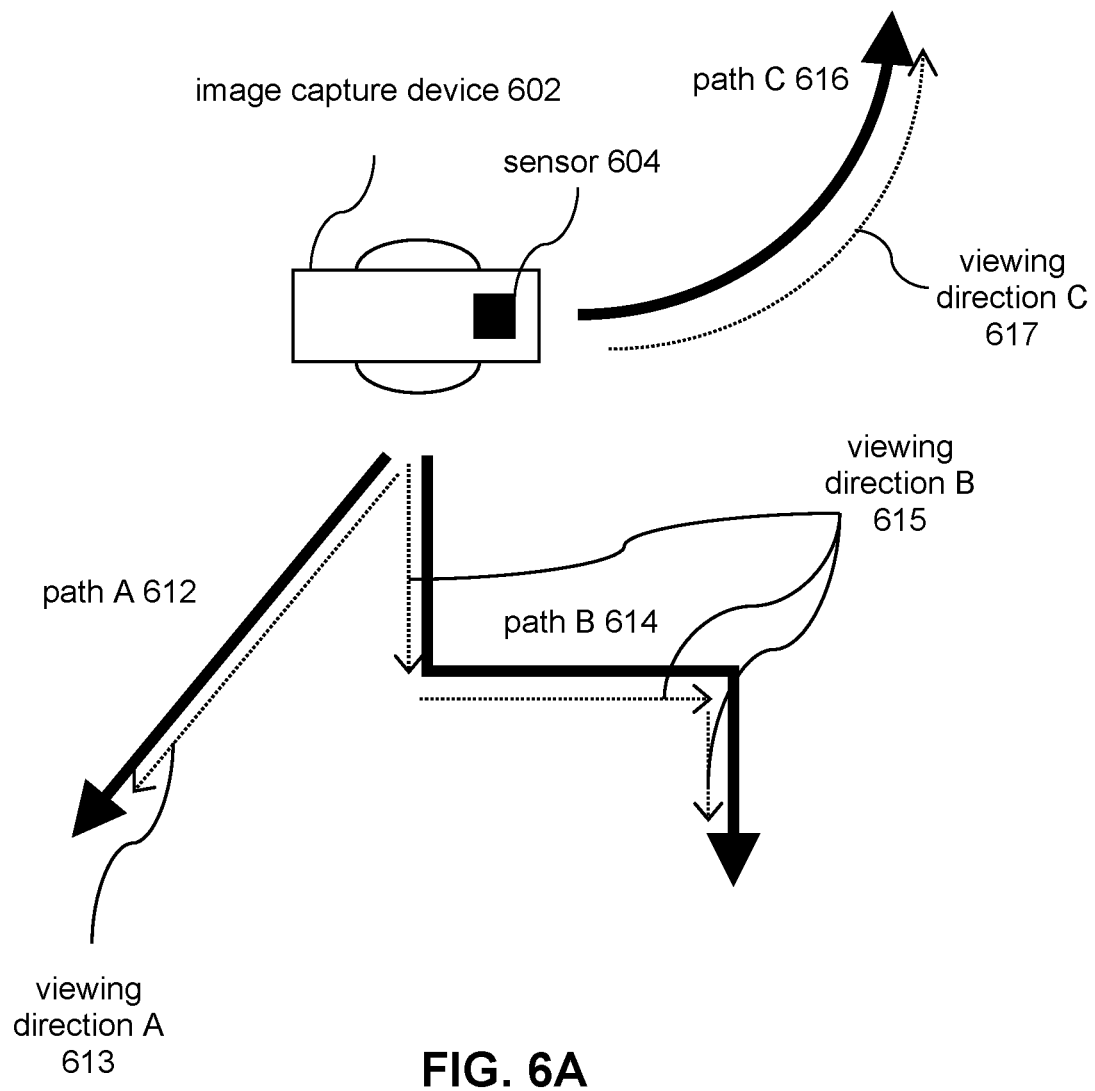
FIGS. 6A-6G illustrate example scenarios for identifying viewing directions for video content based on sensor information.

For instance, FIG. 6A illustrates an example scenario in which an image capture device 602 is in motion during capture of video content by the image capture device 602. The image capture device 602 may include multiple optical elements (e.g., lenses) configured to guide light to one or more image sensors within the image capture device 602. For example, the image capture device 602 may include two optical elements, each having a field of view of 180 degrees or a larger field of view. The fields of view of the optical elements may overlap, allowing the image capture device 602 to capture spherical visual content (e.g., spherical images, spherical videos). The image capture device 602 may include a sensor 604 (e.g., an accelerometer, a gyroscope, an inertial measurement unit, a global positioning system, a distance sensor, and/or other motion/location sensor(s)) that generates output signals conveying the sensor information of the image capture device 602. The sensor 604 may be included in the image capture device 602, carried by the image capture device 602, coupled to the image capture device 602, and/or may otherwise be positioned to generate the sensor information for the image capture device 602.

The sensor information may characterize the direction(s) of motion of the image capture device 602 during the capture of the video content. For example, the sensor information may characterize a direction of motion of the image capture device 602 to the front and right of the image capture device 602 for the image capture device 602 moving on a path A 612. The sensor information may characterize a direction of motion of the image capture device 602 first to the front, then to the left, and then to front for the image capture device 602 moving on a path B 612. The sensor information may characterize a direction of motion of the image capture device 602 moving in an arc to the left and behind for the image capture device 602 moving on a path C 616. Other motions of the image capture device 602 are contemplated.

The sensor information may characterize one or more directions of motion of an object carrying the image capture device(s) during the capture of the video content. An object may refer to a living object (e.g., human, animal, plant) or a non-living object (e.g., vehicle). Motion of an object may refer change in location and/or position of the object. Motion of an object may include translational motion and/or rotational motion. In some implementations, the sensor information may be generated by one or more sensors of the object. For example, an object may include a vehicle, and the sensor information may be generated by one or more sensors of the vehicle, such as an on-board vehicle sensor, a sensor coupled to the vehicle, and/or other sensors of the vehicle. An object may include a person, and the sensor information may be generated by one or more sensors of the person, such as a sensor attached to the person/a body part of the person, a sensor carried by the person, and/or sensors of the person.

Figure 6B:
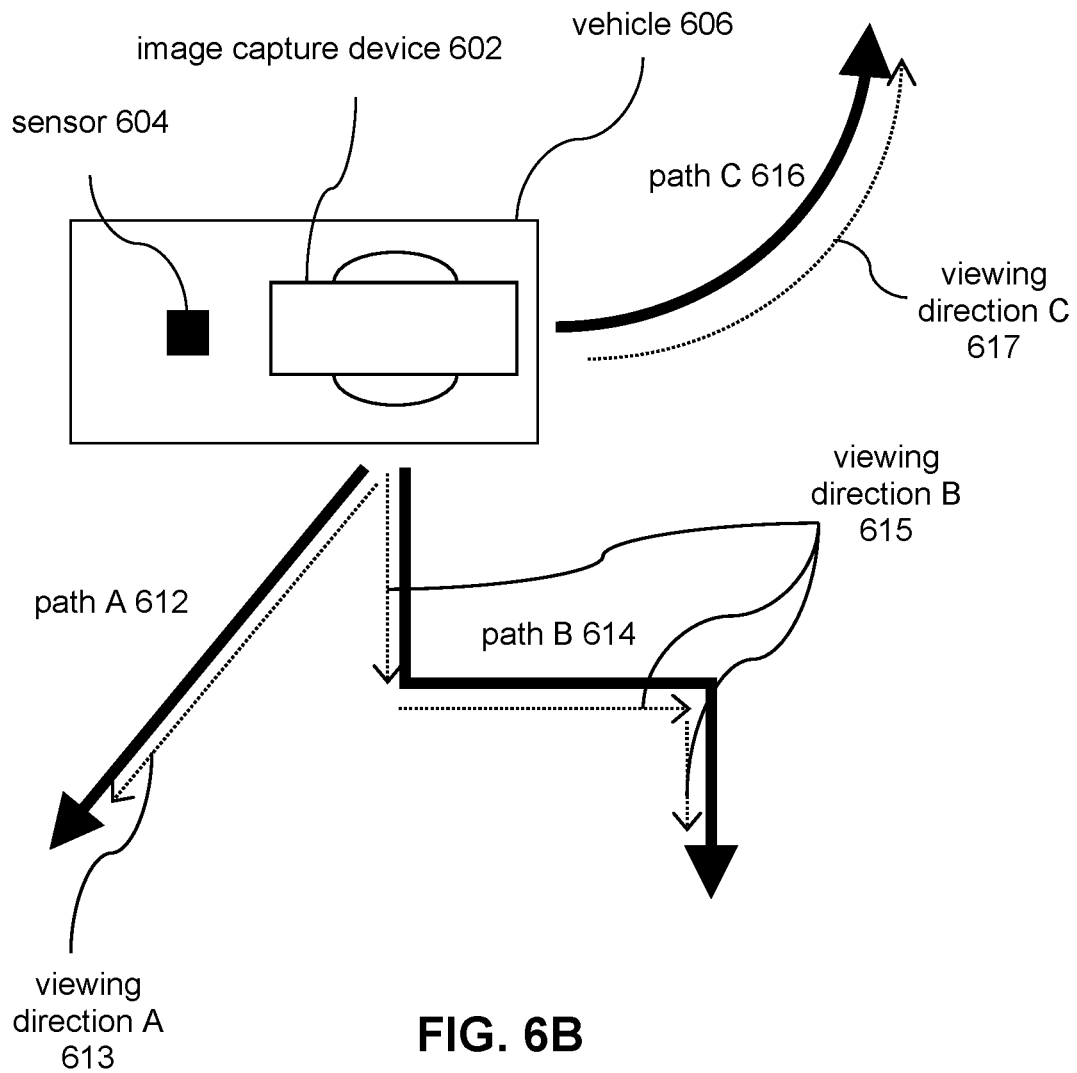

For instance, FIG. 6B illustrates an example scenario in which an image capture device 602 is carried by a vehicle 606 in motion during capture of video content by the image capture device 602. The vehicle 606 may include a sensor 604 (e.g., an accelerometer, a gyroscope, an inertial measurement unit, a global positioning system, a distance sensor, and/or other motion/location sensor(s)) that generates output signals conveying the sensor information of vehicle 606. The sensor 604 may be included in the vehicle 606, carried by the vehicle 606, coupled to the vehicle 606, and/or may otherwise be positioned to generate the sensor information for the vehicle 606.

For example, the sensor 604 may include on-board sensor(s) and/or other sensor(s) of the vehicle 602 that measures one or more of movement of the vehicle 606, rotation of the tires of the vehicle 606 (e.g., speed of rotation, direction of rotation), alignment of the tires of the vehicle 606 (e.g., orientation of the tires with respect to the body of the vehicle 606, such as the front tires being turned to left/right to move the vehicle 606 to the left/right), rotation of the vehicle steering wheel of the vehicle 606 (e.g., rotation to the left/right to move the vehicle 606 to the left/right), usage of break/gas pedal of the vehicle 606, usage of shift stick of the vehicle 606, a tilt of the vehicle (e.g., orientation of the vehicle with respect to ground), and/or other operations/characteristics of the vehicle 606.

The sensor information may characterize the direction(s) of motion of the vehicle 606 during the capture of the video content by the image capture device 602. For example, the sensor information may characterize a direction of motion of the vehicle 606 to the front and right of the vehicle 606 for the vehicle 606 moving on a path A 612. The sensor information may characterize a direction of motion of vehicle 606 first to the front, then to the left, and then to front for the vehicle 606 moving on a path B 612. The sensor information may characterize a direction of motion of the vehicle 606 moving in an arc to the left and behind for the vehicle 606 moving on a path C 616. Other motions of the vehicle 606 are contemplated.

The sensor information may characterize one or more directions of interest for the image capture device(s) during the capture of the video content. A direction of interest may refer to a direction within the field of view of the image capture device(s) which are of more interest to a user than other directions. In some implementations, a direction of interest for the image capture device(s) may be determined based on a mounting of the image capture device(s) and/or other information.

Figure 6C:
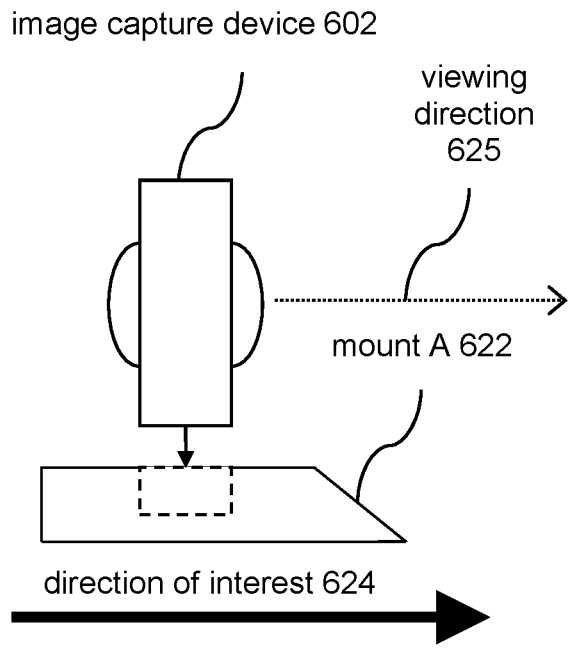
Figure 6D:
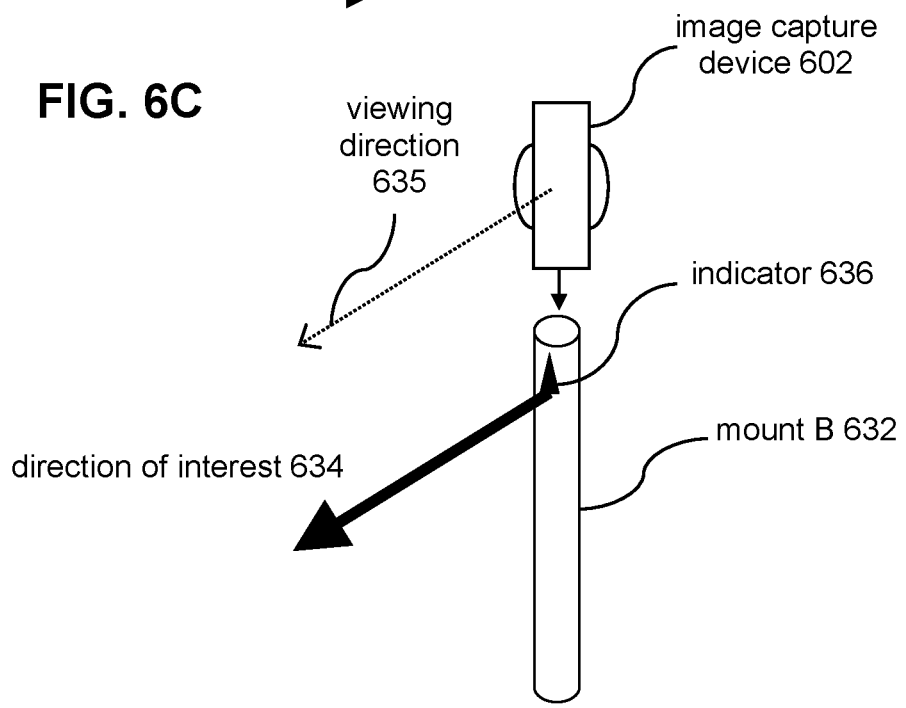

For instance, FIGS. 6C-6D illustrate example scenarios in which an image capture device 602 is mounted during capture of video content by the image capture device 602. In FIG. 6C, the image capture device 602 may be mounted on a mount A 622. The mount A 622 may be associated with a direction of interest, such as a direction of interest 624, which is in a forward direction of the mount A 622. Other directions of interest are contemplated. The image capture device 602 and/or the mount A 622 may include, carry, and/or be coupled to one or more sensors that indicate/ measure mounting/orientation of the image capture device 602 with respect to the mount A 622, and/or with respect to the direction of interest 624. For example, the image capture device 602 may be mounted such that the front of the image capture device 602 is pointed in the opposite direction of the direction of interest 624. That is, the image capture device 602 may be mounted backwards.

In FIG. 6D, the image capture device 602 may be mounted on a mount B 632 (e.g., gimbal). The mount B 632 may be associated with a direction of interest, such as a direction of interest 634. Other directions of interest are contemplated. The mount B 632 may include an indicator 636 to indicate the direction of interest 634. The image capture device 602 and/or the mount B 632 may include, carry, and/or be coupled to one or more sensors that indicate/measure mounting/orientation of the image capture device 602 with respect to the mount B 632, and/or with respect to the direction of interest 634. For example, the image capture device 602 may be mounted such that the front of the image capture device 602 is pointed to the right of the direction of interest 634. That is, the image capture device 602 may be mounted with a rightward rotation.

In some implementations, the direction of interest for a mount may change based on how the mount is used. For example, referring to FIG. 6D, the direction of interest for the mount B 632 may be in the direction of interest 634 based on the mount B 632 being held vertically by a user/parallel to the height of the user (e.g., held like a selfie-stick) while the direction of interest for the mount B 632 may be in an upward direction (in the direction of the bottom of the mount B 632 toward the top of the mount B 632, where the image capture device 602 is mounted) based on the mount B 632 being held extended and away from a user/perpendicular to the height of the user (e.g., held like a pointing rod). Other directions of interest based on mount usage are contemplated.

The sensor information characterize the direction(s) of interest for the image capture device 602 during the capture of the video content. For example, the sensor information may characterize the direction of interest 624 as being pointed towards the back of the image capture device 602 in the mounting configuration shown in FIG. 6C. The sensor information may characterize the direction of interest 624 as being pointed towards the left of the image capture device 602 in the mounting configuration shown in FIG. 6D. Other orientations of the image capture device 602 with respect to the mount/direction of interest are contemplated.

In some implementations, a direction of interest for the image capture device(s) may be determined further based on a user input and/or other information. For example, referring to FIG. 6D, a user may interact with the image capture device 602 and/or the mount B 632 to manually set the direction of interest for the image capture device 602. For instance, the indicator 636 may be rotatable about the mount B 632 to change the direction of interest 634 (e.g., the direction of interest 634 is perpendicular to the indicator 636). Other interactions with the image capture device(s) and/or the mount(s) to set the direction of interest are contemplated.

The sensor information may characterize one or more directions of one or more objects from the image capture device(s) during the capture of the video content. A direction of an object from an image capture device may depend on the orientation of the object with respect to the image capture device. A direction of an object from an image capture device may be static/may not change or may be dynamic/may change during the capture of the video content. A direction of an object from an image capture device may change due to motion of the object and/or the motion of the image capture device.

Figure 6E:
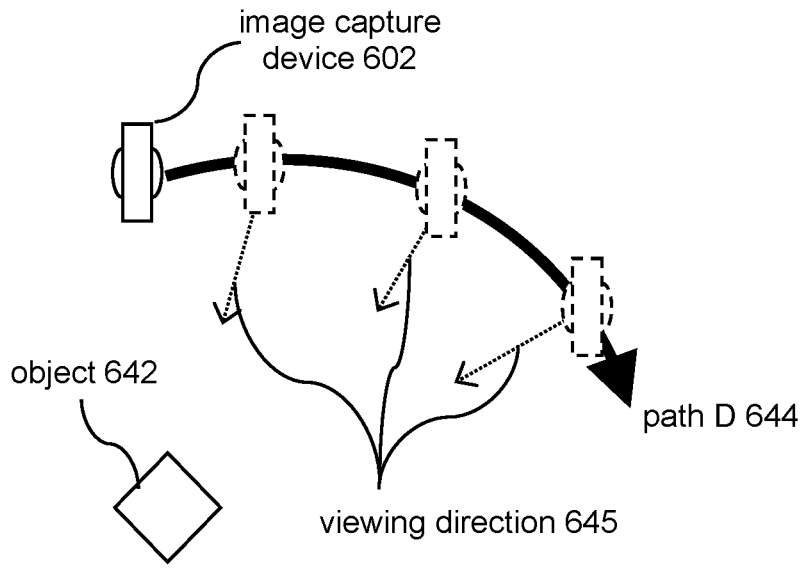
Figure 6F:
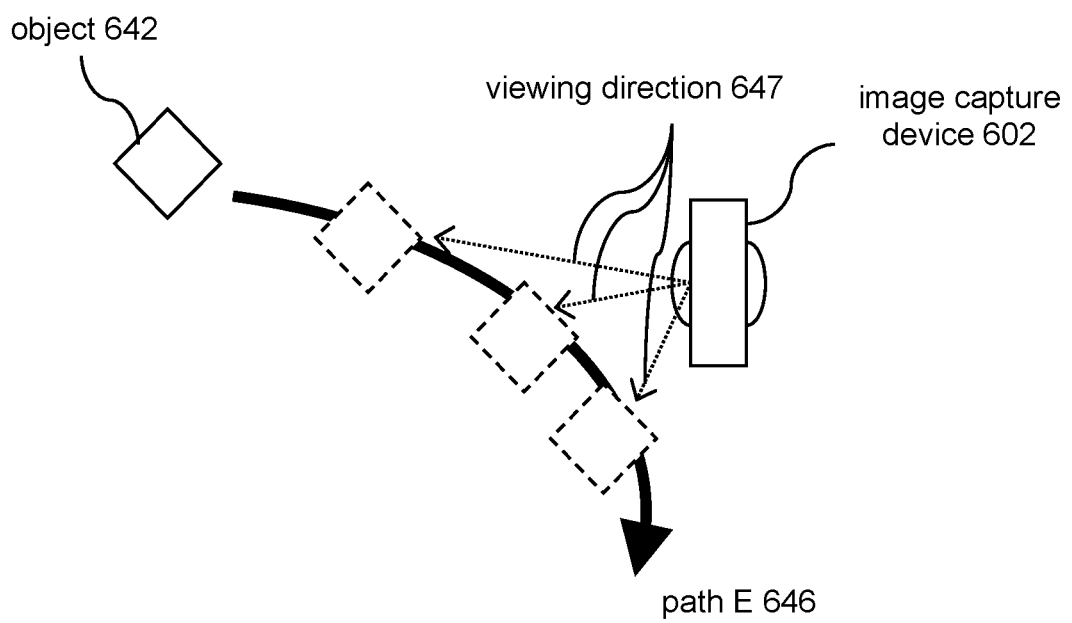

For instance, FIGS. 6E-6F illustrate example scenarios in which a direction of an object 642 from an image capture device 602 changes during capture of video content by the image capture device 602. In FIG. 6E, the direction of the object 642 from the image capture device 602 may change due to motion of the image capture device 602 along a path D 644. In FIG. 6F, the direction of the object 642 from the image capture device 602 may change due to motion of the object 642 along a path E 646.

In some implementations, a direction of an object from the image capture device(s) may be determined based on visual analysis, sensor outputs, and/or other information. For example, referring to FIG. 6E, the direction of the object 642 from the image capture device 602 may be determined based on analysis of image(s)/video(s) taken by the image capture device 602 along different points along the path D 644 to determine where in the image(s)/video(s) the object 642 is located. However, such visual analysis may be resource intensive (e.g., computing power, time, memory, power consumption). Sensor outputs of non-image sensors may provide a less resource intensive method to determine the direction of the object 642 from the image capture device 602.

For example, one or both of the image capture device 602 and the object 642 may include a global positioning system, a distance measurement sensor (e.g., IR distance sensor, laser distance sensor, ultrasonic distance sensor), and/or other location/distance sensor(s). The sensors outputs may be used to determine the positions of the image capture device 602 and the object 642, the position of the image capture device 602 with respect to the object 642, and/or the position of the object 642 with respect to the image capture device 602. For example, outputs of global positioning system data for the image capture device 602 and the object 642 may be used to determine the positions of image capture device 602 and the object 642 within an environment, and their positions may be used to determine the direction of the object 602 from the image capture device 602, the distance between the image capture device 602 and the object 642, and/or other positional information. A distance measurement sensor carried by the image capture device 602 may be used to determine how far and in what direction the object 642 is located from the image capture device 602.

In some implementations, the sensor outputs of non-image sensors may be used in conjunction with the visual analysis of images/videos captured by the image capture device 602 to determine a direction of an object from an image capture device. For example, the sensor outputs of non-image sensors may be used to determine an approximate direction of the objection from the image capture device, and the visual analysis of the images/videos may be limited to the portions of the images/videos corresponding to the approximate direction to fine-tune the direction determination. Such a determination of the detection of an object from an image capture device may be less resource intensive than simply using visual analysis while providing greater accuracy than using just the sensor outputs of non-image sensors.

The viewing direction component 106 may be configured to determine one or more viewing directions for the video content (e.g., spherical video content) based on the sensor information and/or other information. A viewing direction may define a direction of view for video content. A viewing direction may define the angle/visual portion of the video content at which the viewing window is directed. A viewing direction for spherical video content may define a direction of view (characterized by a rotation around a yaw axis, a rotation around a pitch axis, and/or a rotation around a roll axis) from the point of view of the spherical video content as the function of progress through the progress length of the spherical video content, such as the viewing direction 400 shown in FIG. 4. For example, the sensor information may be contained within metadata for video content including capture of a large field of view (over capture) and the sensor information may be used to automate the direction of a viewing window for the video content as a function of progress length through the video content. Such determination of the viewing direction may enable automation of which visual extents of the video content (which portions of the video frames) are presented on one or more displays based on the sensor information at different moments within the progress length of the video content. That is, the viewing direction for the video content may change through the progress length of the video content based on the sensor information corresponding to different moments within the progress length of the video content.

The viewing direction component 106 may determine a viewing direction for video content based on the sensor information characterizing direction(s) of motion of image capture device(s) during capture of the video content. The determination of the viewing direction based on such information may allow a presentation of the video content to include particular visual extents of the video content based on translational motion and/or rotational motion of the image capture device(s). For example, a viewing direction may be determined based on one or more particular motion of an image capture device during capture of the video content. For instance, referring to FIG. 6A, different viewing directions may be determined based on the motion of the image capture device 602 along the path A 612, the path B 614, and/or the path C 616.

For example, based on the motion of the image capture device 602 along the path A 612, a viewing direction A 613 may be determined. The viewing direction A 613 may point along the direction of the translational motion along the path A 612. The viewing direction A 613 may follow the motion of the image capture device 602 along the path A 612 even though the image capture device 602 is not pointed toward the direction of the motion. A viewing direction that follows the motion of an image capture device may include a viewing direction that stays centered in the motion of the image capture device. That is, the image capture device 602 may be moving diagonally (to the front and right of the image capture device 602) during capture of the video content and the viewing direction A 613 for the video content may be pointed in the diagonal direction during the progress length of the video content.

Based on the motion of the image capture device 602 along the path B 614, a viewing direction B 615 may be determined. The viewing direction B 615 may point along the direction of the translational motion along the path B 614. The viewing direction B 615 may follow the motion of the image capture device 602 along the path B 615 even though the image capture device 602 is not necessarily pointed toward the direction of the motion. That is, the image capture device 602 may be moving to the front, then to the left, and then to front during capture of the video content and the viewing direction B 615 for the video content may be pointed to the front, to the left, and then to the front during the progress length of the video content.

Based on the motion of the image capture device 602 along the path C 616, a viewing direction C 617 may be determined. The viewing direction C 617 may point along the direction of the translational motion along the path C 616. The viewing direction C 617 may follow the motion of the image capture device 602 along the path C 617 even though the image capture device 602 is not necessarily pointed toward the direction of the motion. That is, the image capture device 602 may be moving in an arc to the left and behind during capture of the video content and the viewing direction C 617 for the video content may change from being pointed to the left to the back during the progress length of the video content.

As another example, a viewing direction may primarily follow the forward motion of the image capture device 602 along the path B 615. A viewing direction that primarily follows the forward motion of an image capture device may include a viewing direction that generally stays centered in the forward motion of the image capture device. For example, the portion of the path B 614 towards the front of the image capture device 602 may be longer (with respect to distance of the portion and/or time to move along the portion) than the portion of the path B 614 towards the left of the capture device 602. In one instance, the viewing direction may be determined to follow the direction of the motion along the longer portion of the path B 614, that is the front direction, even for the segment of the progress length of the video content captured while the image capture device 602 was moving along the portion of the path B 614 towards the left of the capture device 602. Such a viewing direction may stay centered on the front/backward motion of the image capture device 602 while disregarding lateral motion of the image capture device 602. In another instance, the viewing direction may be determined to weigh (have more impact on determination of) the directions of motion along different portions of the path B 614 differently, such as by weighing a portion having greater distance and/or great travel time more than a portion have less distance and/or less travel time. The resulting viewing direction may be pointed towards the front-left of the image capture device 602 during the progress length of the video content. That is, the directions of motion along the path B 614 may be averaged to determine the viewing direction.

The viewing direction may be determined to smooth abrupt changes in the motion of the image capture device 602. For example, the image capture device 602 may be moving to the front, then to the left, and then to front during capture of the video content and the viewing direction for the video content may be pointed to the front, to the left, and then to the front. The transition of the viewing direction from the front, to the left, and then to the front may be smoothed so that the viewing direction does not abruptly change (e.g., jump from 0-degrees to −90-degrees rotation about the yaw axis) but includes a gradual change (moves from 0-degrees to −90-degrees rotation about the yaw axis). Determination of viewing directions based on other motion of the image capture device 602 are contemplated.

The viewing direction component 106 may determine a viewing direction for video content based on the sensor information characterizing direction(s) of motion of an object carrying image capture device(s) during capture of the video content. The determination of the viewing direction based on such information may allow a presentation of the video content to include particular visual extents of the video content based on translational motion and/or rotational motion of the object carrying the image capture device(s). For example, a viewing direction may be determined based on one or more particular motion of an object carrying an image capture device during capture of the video content. For instance, referring to FIG. 6B, different viewing directions may be determined based on the motion of vehicle 606 carrying the image capture device 602 along the path A 612, the path B 614, and/or the path C 616.

For example, based on the motion of the vehicle 606 along the path A 612, a viewing direction A 613 may be determined. The viewing direction A 613 may point along the direction of the translational motion along the path A 612. The viewing direction A 613 may follow the motion of the vehicle 606 along the path A 612 even though the image capture device 602 is not pointed toward the direction of the motion. A viewing direction that follows the motion of an object may include a viewing direction that stays centered in the motion of the object. That is, the vehicle 606 may be moving diagonally (to the front and right) during capture of the video content and the viewing direction A 613 for the video content may be pointed in the diagonal direction during the progress length of the video content.

Based on the motion of the vehicle 606 along the path B 614, a viewing direction B 615 may be determined. The viewing direction B 615 may point along the direction of the translational motion along the path B 614. The viewing direction B 615 may follow the motion of the vehicle 606 along the path B 615 even though the image capture device 602 is not necessarily pointed toward the direction of the motion. That is, the vehicle 606 may be moving to the front, then to the left, and then to front during capture of the video content and the viewing direction B 615 for the video content may be pointed to the front, to the left, and then to the front during the progress length of the video content.

Based on the motion of the vehicle 606 along the path C 616, a viewing direction C 617 may be determined. The viewing direction C 617 may point along the direction of the translational motion along the path C 616. The viewing direction C 617 may follow the motion of the vehicle 606 along the path C 617 even though the image capture device 602 is not necessarily pointed toward the direction of the motion. That is, vehicle 606 may be moving in an arc to the left and behind during capture of the video content and the viewing direction C 617 for the video content may change from being pointed to the left to the back during the progress length of the video content.

As another example, a viewing direction may primarily follow the forward motion of the vehicle 606 along the path B 615. A viewing direction that primarily follows the forward motion of an object may include a viewing direction that generally stays centered in the forward motion of object. For example, the portion of the path B 614 towards the front may be longer (with respect to distance of the portion and/or time to move along the portion) than the portion of the path B 614 towards the left. In one instance, the viewing direction may be determined to follow the direction of the motion of the vehicle 606 along the longer portion of the path B 614, that is the front direction, even for the segment of the progress length of the video content captured while the vehicle 606 was moving along the portion of the path B 614 towards the left. Such a viewing direction may stay centered on the front/backward motion of the vehicle 606 while disregarding lateral motion of the vehicle 606. In another instance, the viewing direction may be determined to weigh the directions of motion along different portions of the path B 614 differently, such as by weighing a portion having greater distance and/or great travel time more than a portion have less distance and/or less travel time. The resulting viewing direction may be pointed towards the front-left during the progress length of the video content. That is, the directions of motion of the vehicle 606 along the path B 614 may be averaged to determine the viewing direction.

The viewing direction may be determined to smooth abrupt changes in the motion of the vehicle 606. For example, the vehicle 606 may be moving to the front, then to the left, and then to front during capture of the video content and the viewing direction for the video content may be pointed to the front, to the left, and then to the front. The transition of the viewing direction from the front, to the left, and then to the front may be smoothed so that the viewing direction does not abruptly change (e.g., jump from 0-degrees to −90-degrees rotation about the yaw axis) but includes a gradual change (moves from 0-degrees to −90-degrees rotation about the yaw axis). Determination of viewing directions based on other motion of the object are contemplated.

Such determinations of viewing directions may enable presentation of video content that is centered on one or more particular directions regardless of the rotation of the image capture device(s). For example, the motion of the image capture device 602 along the path A 612 may include rotational motion of the image capture device 602, such as due to the image capture device 602 being rotated, shaken, and/or otherwise physically disturbed. For instance, the image capture device 602 may be mounted on a helmet worn by a person walking along the path A 612, and the image capture device 602 may include rotation motion due to the unevenness of the ground along the path A 612, rotation of the person's head, and/or other factors. The image capture device 602 may be mounted on a helmet worn by a person riding a bike along the path A 612, and the image capture device 602 may include rotation motion due to the unevenness of the ground along the path A 612, rotation of the person's head during the ride, and/or other factors. Playback of video content captured by the image capture device 602 may include changes due to the rotation of the image capture device 602. For example, while the person was walking/riding along the path A 612, the person may have look to the left and then to the right. The video content captured by the image capture device 602 may include the head movements of the person. Such movements of the video content may not be desirable when presenting the video content, such as when a user wishes to see the forward progression of the image capture device 602. On the other hand, the determination of the viewing direction based on the sensor information allows a view of the video content (e.g., camera view) to be directed in one or more particular direction of motion (e.g., forward movement) and to offset undesired rotations of the image capture device 602.

For example, an image capture device may be mounted to a helmet worn by a person driving a racing car/motorcycle. The user may move/rotate the helmet during the race, which may be captured within video content captured by the image capture device. The determination of the viewing direction based on the sensor information may allow a view of the video content to be directed in the forward direction of the racing car/motorcycle regardless of the movement/rotation of the helmet during the race. For example, a driver may turn his head to look behind him during the race. The viewing direction may offset this movement to keep the view of the video content focused on the track in front of the car/motorcycle instead of having the view sweep to the back of the user. A driver may begin a turn (e.g., detected based on location sensor, wheel sensor, steering wheel sensor, vehicle tilt sensor) and the viewing direction may follow the turn to keep the view of the video content focused on the track in front of the car. In some implementations, the viewing direction may allow for deviation from the particular (e.g., forward) direction, such as when a particular head swivel indicates that the user of the image capture device indicates an intent to momentarily change the viewing direction.

Determination of the viewing direction based on particular moving direction(s) (e.g., forward movement) may give users more flexibility in how the image capture device(s) are mounted. For instance, a user may mount an image capture device on a bicycle frame in any orientation and the viewing direction may be determined to point towards the forward movement (e.g., front) of the bicycle. Even if the image capture device is mounted tilted, backwards, or in other directions, the determination of the viewing direction based on the particular moving direction(s) may identify the direction of view that is of interest to the user.

In some implementations, the determination of the viewing direction may be further based on the type of the object carrying the image capture device(s). For example, the determination of the viewing direction may be different for video content captured by an image sensor carried by a person versus a vehicle. The determination of the viewing direction may be different for video content captured by an image sensor carried by a car versus a motorcycle. For example, image capture devices may be carried by a motorcycle and a bicycle. Based on a tilt sensor for the motorcycle indicating the motorcycle is at a particular leaning angle/past a particular leaning angle, the viewing direction may point towards the back to provide a backward shot (e.g., view of a user's knee dragging on the pavement). On the other hand, the leaning of the bicycle may not cause the viewing direction to change or to change differently. Other determinations of viewing directions based on the type of the object carrying the image capture device(s) are contemplated.

In some embodiments, the viewing direction may be determined further based on status of the object carrying the image capture device(s). For example, based on an image capture device being carried by a person, the viewing direction may be determined further based on the status of the person. When the person is moving (e.g., running) quickly, the viewing direction may point towards the direction of movement. When the person is resting (e.g., determined based on GPS sensor, determined based on biometric sensor), the viewing direction may pan around to provide a view of the environment around the person. Determination of viewing direction based on status of other objects are contemplated.

The viewing direction component 106 may determine a viewing direction for video content based on the sensor information characterizing direction(s) of interest for image capture device(s) during capture of the video content. The determination of the viewing direction based on such information may allow a presentation of the video content to include particular visual extents of the video content based on mounting of the image capture device. For example, a viewing direction may be determined based on how/in what orientation the image capture device was mounted/what mount was used during capture of the video content. For instance, referring to FIG. 6C, based on the mounting of the image capture device 602 to the mount A 622, a viewing direction 625 may be determined. The viewing direction 625 may point along the direction of interest 624 for the mount A 622. Referring to FIG. 6D, based on the mounting of the image capture device 602 to the mount B 632, a viewing direction 635 may be determined. The viewing direction 635 may point along the direction of interest 634 for the mount B 632.

Determination of the viewing direction based on the direction(s) of interest may give users more flexibility in how the image capture device(s) are mounted. For instance, a user may mount an image capture device on the mount B 632 in any orientation and the viewing direction may be determined to point towards the direction of interest 634. Even if the image capture device is mounted tilted, backwards, or in other directions, the determination of the viewing direction based on the direction(s) of interest may identify the direction of view that is of interest to the user. In some implementations, the viewing direction may change based on changes in the direction(s) of interest. Referring to FIG. 6D, the direction of interest for the mount B 632 may change based on how the user is holding the mount B 632 (e.g., how the user is holding a gimbal to which an image capture device is mounted). For example, the direction of interest for the mount B 632 may be in the direction of interest 634 based on the mount B 632 being held vertically by a user/parallel to the height of the user (e.g., held like a selfie-stick) while the direction of interest for the mount B 632 may be in an upward direction (in the direction of the bottom of the mount B 632 toward the top of the mount B 632, where the image capture device 602 is mounted) based on the mount B 632 being held extended and away from a user/perpendicular to the height of the user (e.g., held like a pointing rod). The viewing direction may change from one direction to the other as the user's use of the mount B 632 changes.

The viewing direction component 106 may determine a viewing direction for video content based on the sensor information characterizing direction(s) of object(s) from image capture device(s) during capture of the video content. The determination of the viewing direction based on such information may allow a presentation of the video content to include particular visual extents of the video content based on orientation of the image capture device(s) to the object(s). For example, a viewing direction may be determined based on a direction of an object from an image capture device during capture of the video content. For instance, referring to FIGS. 6A-6B, different viewing directions may be determined based on direction of the object 642 from the image capture device 602.

For example, referring to FIG. 6A, based on the image capture device 602 moving along the path D 644, the direction of the object 642 from the image capture device 602 may change during capture of video content. Based on the directions of the object 642 from the image capture device 602, a viewing direction 645 may be determined. The viewing direction 645 may point towards the object 642 even though the image capture device 602 is not pointed towards the object 642.

Referring to FIG. 6B, based on the object 642 moving along the path E 646, the direction of the object 642 from the image capture device 602 may change during capture of video content. Based on the directions of the object 642 from the image capture device 602, a viewing direction 647 may be determined. The viewing direction 647 may point towards the object 642 even though the image capture device 602 is not pointed towards the object 642.

In some implementations, the viewing direction may be determined further based on a distance between the object and the image capture device(s). For example, the viewing direction may be determined to point towards an object based on the object being at a certain distance of an image capture device, the object coming within a certain distance of the image capture device, and/or the object moving beyond a certain distance of the image capture device. Such determination of the viewing direction may allow for the viewing direction to be affected by the orientation of the image capture device to the object when the image capture device and the object are apart by a certain distance/range of distances. For example, the sensor information may be used to determine when a particular object (e.g., person, vehicle) is passing an image capture device/another object carrying the image capture device and the viewing direction may be determined to follow the particular object's passing. The sensor information may be used to determine when a particular object is coming up on/moving away from an image capture device/another object carrying the image capture device at a particular speed/at a particular direction and the viewing direction may be determined to include a view of the particular object.

Figure 6G:
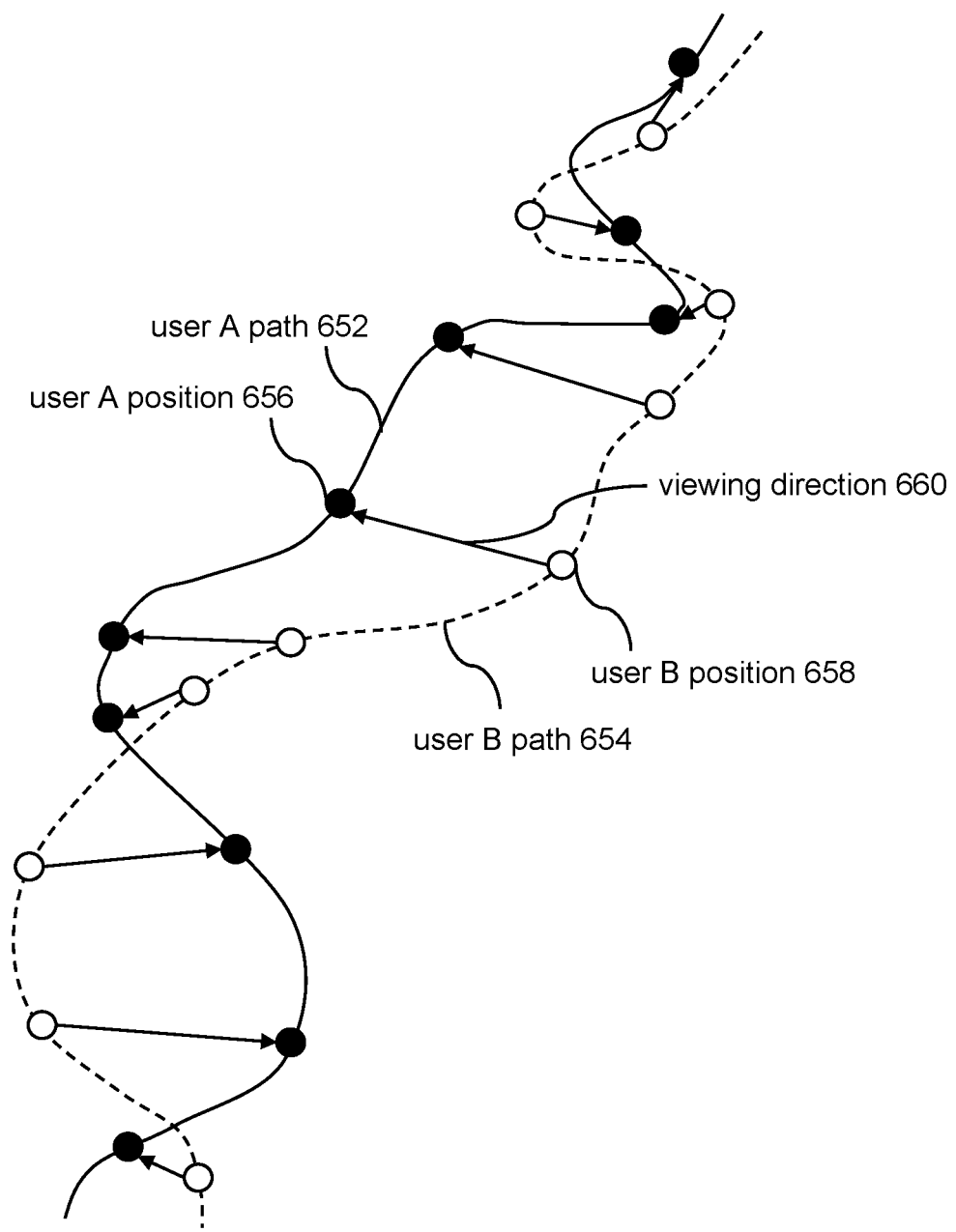

FIG. 6G illustrates an example scenario in which the orientation of an image capture device to an object changes during capture of video content by the image capture device. User A may be moving along a user A path 652. Positions of the user A on the user A path 652 at different moments during capture of the video content are shown by black circles (user A position 656). The image capture device may be carried by a user B moving along a user B path 654. Positions of the user B on the user B path 654 at different moments during capture of the video content are shown by white circles (user B position 658). A viewing direction 660 for the video content may be determined based on directions of user A from image capture device during capture of the video content. For example, GPS data from the user A and the user B may be used to track where the user A is located in the video content captured by user B's image capture device, and the viewing direction for the video content may be automatically set to follow the user A. Such determination of viewing direction allows the user B to record a video (e.g., spherical video) without thinking about where the user B is located during the recording. Keyframes may be added to the GPS data as a free sync to enable presentation of the video that follows the user A. In some implements, both users A and B may be carrying image capture devices, and footages captured by one of the users may be used to identify footages (segment(s) of the progress length of the video content, visual extent of the video frames for the segment(s)) including the other user.

In some implementations, determination of viewing direction based on sensor information may simulate stabilization of the video content. By keeping the viewing direction in one or more directions based on the sensor information, the visual content presented with the viewing window for the video content may be more stable than if user were watching the effects of the movement (e.g., undesired rotation) of the image capture device(s). Such stabilization of the video content may be much less resource intensive (e.g., computing power, time, memory, power consumption) than the use of visual analysis/transformation to stabilize the video content. Additionally, the presentation of the video content may automatically include a compelling view of interest which does not require the user viewing the video content to manually change the direction of view.

In some implementations, visual analysis and/or computer vision may be performed based on the viewing directions. Visual analysis and/or computer vision may be performed within a portion of a video frame (e.g., spherical video frame) surrounding the viewing direction to identify particular visuals captured within the video content. For example, visual analysis/computer vision may be performed at/near the viewing direction to identify classes of subjects/events which are of interest to users, persons, persons in motion, gestures, emotion (e.g., smiling, frowning), animals, objects associated with a given activity (e.g., activity equipment such as a surfing board, activity scene/environment such as a wave), actions (e.g., jumps, dancing), and/or other visuals captured within the video content. In some implementations, identification of the visuals captured within the video content may be used to determine the viewing size (e.g., extent, shape, size, rotation) of the viewing window to be used to present the video content.

Localization of the visual analysis/computer vision to/near the viewing direction (e.g., portions of spherical video frames) may provide for resource savings (e.g., computing power, time, memory, power consumption) compared to performing visual analysis/computer vision over the entirety of the video content (e.g., entire spherical video frames). In some implementations, the visual analysis/computer vision may be used to determine different amounts of interest levels, certainty of identification, and/or other metrics at various portions (in time and space) within the video content. Other uses of the viewing directions are contemplated.

The presentation component 108 may be configured to present the video content (e.g., spherical video content) on one or more displays (e.g., the display 14) based on the viewing direction and/or other information. The video content may be presented on one or more displayed based on the viewing direction and/or other information. For example, based on the viewing direction(s) (such as shown in FIG. 4) determined based the sensor information, a given visual portion/extent of the video content may be presented on the display(s). Such presentation of the video content may provide for a punch-out view of the video content.

The presentation of the video content based on the viewing direction may be provided as a "default" view for the video content. That is, the view of the video content may automatically change based on changes in the viewing direction. In some implementations, a user viewing the video content may deviate from the "default" view. For example, a user may deviate from a front viewing direction by manually adjusting the viewing direction while watching the video content. In some implementations, when a user stops manually adjusting the viewing direction, the viewing direction may return to the "default" view.

In some implementations, the presentation component 108 may be configured to stabilize the video content (e.g., spherical video content) based on the viewing direction(s) and/or other information. For example, electrical stabilization may be performed as part of post-capture processing to stabilize the video content in the direction of the viewing direction since users are likely to view the video content using the viewing direction. For instance, spherical video content may be captured while a user is skiing down a slope. The spherical video content may include two viewing directions/directions of interest: one direction towards the downhill movement and another direction towards the user's face. High value stabilized content may be extracted from the two viewing directions/directions of interest.

In some implementations, the presentation component 108 may be configured to generate one or more video summaries of the video content. A video summary may refer to a particular arrangement and/or manipulation of one or more portions (e.g., video clips) of the video content. A video summary may include portion(s) of the video content to provide an overview of the video content. A video summary may include portion(s) of the video content identified based on the viewing direction, and/or other information. The portion(s) of the video content identified may relate to particular spatial portion(s) (portion(s) of a video frame) and particular temporal segment(s) (video frames corresponding to particular moments within the progress length of the video content).

For example, an automatic cut of spherical images/videos may be generated by reframing the spherical images/videos to include those portions (field of view) corresponding to the viewing direction/direction of interest. The automatic cut of spherical images/videos may be biased to show particular directions/field of view within the spherical images/videos based on sensor information characterizing capture of the images/videos.

A video summary may be generated as encoded video content and/or instructions for rendering the video summary. For example, the video summary may be generated an encoded version of a particular video clip, and the video clip may be opened in a video player for presentation. The video summary may be generated as instructions identifying arrangement, manipulation, and/or viewing directions of one or more portions of video content included in the video summary. For example, the video summary information may define a director track that includes information as to which portions of the video content are included in the video summary, the order in which the portions are to the presented on playback, and the viewing directions to use for the different portions. A video player may use the director track to retrieve the portions of the video content identified in the video summary for presentation when the video summary is opened/to be presented.

Video summary information defining the video summary (e.g., encoded video content, director track) and/or other information defining viewing directions may be stored in one or more storage media. For example, the video summary information may be stored in the electronic storage 13, remote storage locations (storage media located at/accessible through a server), and/or other locations. In some implementations, the video summary information may be stored through one or more intermediary devices. For example, the processor 11 may be located within a computing device without a connection to the storage device (e.g., the computing device lacks WiFi/cellular connection to the storage device). The video summary information may be stored through another device that has the necessary connection (e.g., the computing device using a WiFi/cellular connection of a paired mobile device, such as a smartphone, tablet, laptop, to store information in one or more storage media). Other storage locations for and storage of the video summary information are contemplated.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
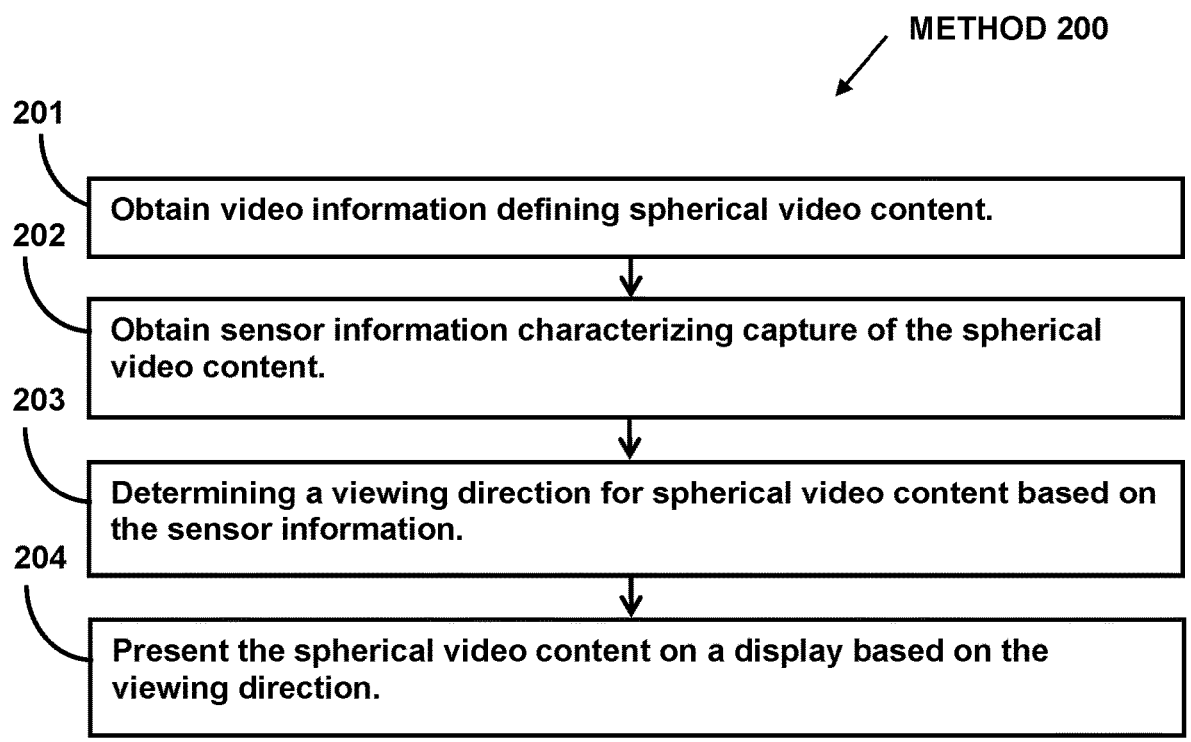
FIG. 2 illustrates a method for identifying viewing directions for video content.

FIG. 2 illustrates method 200 for identifying viewing directions for video content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be obtained. The spherical video content may have a progress length. The spherical video content may define visual content viewable from a point of view as a function of progress through the progress length of the spherical video content. In some implementation, operation 201 may be performed by a processor component the same as or similar to the video information component 102 (Shown in FIG. 1 and described herein).

At operation 202, sensor information may be obtained. The sensor information may characterize capture of the spherical video content. In some implementations, operation 202 may be performed by a processor component the same as or similar to the sensor information component 104 (Shown in FIG. 1 and described herein).

At operation 203, a viewing direction for the spherical video content may be determined based on the sensor information. The viewing direction may define a direction of view for the spherical video content from the point of view as the function of progress through the progress length of the spherical video content. In some implementations, operation 203 may be performed by a processor component the same as or similar to the viewing direction component 106 (Shown in FIG. 1 and described herein).

At operation 204, the spherical video content may be presented on a display based on the viewing direction. In some implementations, operation 204 may be performed by a processor component the same as or similar to the presentation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying viewing directions for video content, the system comprising:
   one or more physical processors configured by machine-readable instructions to:
   obtain video information defining the video content, the video content having a progress length, the video content captured by an image capture device positioned on a mount, the mount having a direction of interest that is used to point a viewing direction for the video content captured by the image capture device while the image capture device is positioned on the mount, wherein the direction of interest for the mount includes a forward direction of the mount;
   obtain sensor information, the sensor information characterizing orientation of the image capture device with respect to the direction of interest for the mount, wherein responsive to the image capture device being positioned on the mount such that front of the image capture device is pointed in a direction away from the direction of interest for the mount, the sensor information characterizes the direction of interest for the mount as being pointed away from the front of the image capture device;
   determine the viewing direction for the video content based on the orientation of the image capture device with respect to the direction of interest for the mount such that the viewing direction points along the direction of interest for the mount, wherein responsive to the sensor information characterizing the direction of interest for the mount as being pointed away from the front of the image capture device, the viewing direction is determined to point away from front of the video content; and
   present the video content on a display based on the viewing direction;
   wherein responsive to the image capture device being positioned on the mount such that a front direction of the video content is pointed away from the forward direction of the mount, the viewing direction for the video content is determined to compensate for the front direction of the video content being pointed away from the forward direction of the mount and is determined to point towards the direction of interest such that a punch-out view of the video content is centered in the forward direction of the mount.

2. The system of claim 1, wherein:
the video content includes spherical video content, the spherical video content defining visual content from a point a view as a function of progress through the progress length of the spherical video content; and
responsive to the sensor information characterizing the direction of interest for the mount as being pointed towards back of the image capture device, the viewing direction is determined to point towards back of the spherical video content.

3. The system of claim 1, wherein the mount includes an indicator to indicate the direction of interest for the mount.

4. The system of claim 3, wherein the indicator is rotatable about the mount to change the direction of interest for the mount.

5. The system of claim 1, wherein the mount includes a gimbal.

6. The system of claim 5, wherein the direction of interest for the gimbal changes based on orientation in which the gimbal is held by a user.

7. The system of claim 6, wherein based on the gimbal being held vertically by the user, the direction of interest is pointed in a direction perpendicular to the gimbal.

8. The system of claim 6, wherein based on the gimbal being held extended and away from the user, the direction of interest is pointed in a top direction of the gimbal.

9. A method for identifying viewing directions for video content, the method performed by a computing system including one or more processors, the method comprising:
obtaining video information defining the video content, the video content having a progress length, the video content captured by an image capture device positioned on a mount, the mount having a direction of interest that is used to point a viewing direction for the video content captured by the image capture device while the image capture device is positioned on the mount, wherein the direction of interest for the mount includes a forward direction of the mount;
obtaining sensor information, the sensor information characterizing orientation of the image capture device with respect to the direction of interest for the mount, wherein responsive to the image capture device being positioned on the mount such that front of the image capture device is pointed in a direction away from the direction of interest for the mount, the sensor information characterizes the direction of interest for the mount as being pointed away from the front of the image capture device;
determining the viewing direction for the video content based on the orientation of the image capture device with respect to the direction of interest for the mount such that the viewing direction points along the direction of interest for the mount, wherein responsive to the sensor information characterizing the direction of interest for the mount as being pointed away from the front of the image capture device, the viewing direction is determined to point away from the front of the video content; and
presenting the video content on a display based on the viewing direction;
wherein responsive the image capture device being positioned on the mount such that a front direction of the video content is pointed away from the forward direction of the mount, the viewing direction for the video content is determined to compensate for the front direction of the video content being pointed away from the forward direction of the mount and is determined to point towards the direction of interest such that a punch-out view of the video content is centered in the forward direction of the mount.

10. The method of claim 9, wherein:
the video content includes spherical video content, the spherical video content defining visual content from a point a view as a function of progress through the progress length of the spherical video content; and
responsive to the sensor information characterizing the direction of interest for the mount as being pointed towards back of the image capture device, the viewing direction is determined to point towards back of the spherical video content.

11. The method of claim 9, wherein the mount includes an indicator to indicate the direction of interest for the mount.

12. The method of claim 11, wherein the indicator is rotatable about the mount to change the direction of interest for the mount.

13. The method of claim 9, wherein the mount includes a gimbal.

14. The method of claim 13, wherein the direction of interest for the gimbal changes based on orientation in which the gimbal is held by a user.

15. The method of claim 14, wherein based on the gimbal being held vertically by the user, the direction of interest is pointed in a direction perpendicular to the gimbal.

16. The method of claim 14, wherein based on the gimbal being held extended and away from the user, the direction of interest is pointed in a top direction of the gimbal.

17. A system for identifying viewing directions for video content, the system comprising:
one or more physical processors configured by machine-readable instructions to:
obtain video information defining the video content, the video content having a progress length, the video content captured by an image capture device positioned on a mount, the mount having a direction of interest that is used to point a viewing direction for the video content captured by the image capture device while the image capture device is positioned on the mount, wherein the direction of interest for the mount includes a forward direction of the mount, further wherein the mount includes an indicator to indicate the direction of interest for the mount;
obtain sensor information, the sensor information characterizing orientation of the image capture device with respect to the direction of interest for the mount, wherein responsive to the image capture device being positioned on the mount such that front of the image capture device is pointed in a direction away from the direction of interest for the mount, the sensor information characterizes the direction of interest for the mount as being pointed away from the front of the image capture device;
determine the viewing direction for the video content based on the orientation of the image capture device with respect to the direction of interest for the mount such that the viewing direction points along the direction of interest for the mount, wherein responsive to the sensor information characterizing the direction of interest for the mount as being pointed away from the front of the image capture device, the viewing direction is determined to point away from front of the video content; and present the video content on a display based on the viewing direction;

wherein responsive to the image capture device being positioned on the mount such that a front direction of the video content is pointed away from the forward direction of the mount, the viewing direction for the video content is determined to compensate for the front direction of the video content being pointed away from the forward direction of the mount and is determined to point towards the direction of interest such that a punch-out view of the video content is centered in the forward direction of the mount.

18. The system of claim 17, wherein:

the indicator is rotatable about the mount to change the direction of interest for the mount; and responsive to the mount including a gimbal, the direction of interest for the gimbal changes based on orientation in which the gimbal is held by a user.

19. The system of claim 18, wherein based on the gimbal being held vertically by the user, the direction of interest is pointed in a direction perpendicular to the gimbal.

20. The system of claim 18, wherein based on the gimbal being held extended and away from the user, the direction of interest is pointed in a top direction of the gimbal.

* * * * *